United States Patent [19]

Schädel et al.

[11] 4,304,251

[45] Dec. 8, 1981

[54] DOUBLE SEAT VALVE WITH LEAK CONTROL

[76] Inventors: Hermann Schädel, Piwittsheide 6, 5843 Ergste; Franz Heinz, Feuerbachstr. 44, 4618 Kamen, both of Fed. Rep. of Germany

[21] Appl. No.: 962,148

[22] Filed: Nov. 20, 1978

[30] Foreign Application Priority Data

Nov. 19, 1977 [DE] Fed. Rep. of Germany ....... 2751732
Nov. 19, 1977 [DE] Fed. Rep. of Germany ....... 2751734

[51] Int. Cl.³ .................. F16K 11/20; F16K 51/00
[52] U.S. Cl. .................. 137/240; 137/312; 137/614.17; 137/614.18; 137/614.19; 137/637.2; 251/285
[58] Field of Search ........... 137/237, 238, 240, 637.2, 137/241, 312, 614.16, 614.17, 614.18, 614.19

[56] References Cited

U.S. PATENT DOCUMENTS 3,517,688 6/1970 Scholle ........................ 137/240

FOREIGN PATENT DOCUMENTS

| | | | |
|---|---|---|---|
| 2248986 | 4/1974 | Fed. Rep. of Germany | 137/312 |
| 568512 | 10/1975 | Fed. Rep. of Germany | 137/312 |
| 2449432 | 4/1976 | Fed. Rep. of Germany | 137/238 |
| 2531019 | 1/1977 | Fed. Rep. of Germany | 137/312 |
| 2532838 | 1/1977 | Fed. Rep. of Germany | 137/312 |
| 2623201 | 12/1977 | Fed. Rep. of Germany | 137/240 |

*Primary Examiner*—A. Michael Chambers
*Attorney, Agent, or Firm*—Toren, McGeady & Stanger

[57] ABSTRACT

In a double seat valve with leak control, two valve discs are located within a housing and each is movably displaceable between an open position and a closed position by adjusting devices. The valve discs are shaped to form a hollow space between them. One adjusting device moves one of the valve discs into the open position and into contact with the other valve disc and displaces the other valve disc into the open position. Each valve disc has a separate adjusting device for displacing it into the open position but not into contact with the other valve disc. A shaft is connected to each valve disc and the adjusting device or devices moves the disc via its shaft. One of the shafts is tubular and its hollow interior is connected to the hollow space defined by the valve discs and provides a leaking liquid line from the hollow space. In one embodiment, a cleaning medium supply line is located in the tubular shaft and supplies cleaning medium into the hollow space from a nozzle.

6 Claims, 3 Drawing Figures

DOUBLE SEAT VALVE WITH LEAK CONTROL

SUMMARY OF THE INVENTION

The invention relates to a double seat valve with leak control and two valve discs which can be moved independently of one another and relative to one another, wherein one of the valve discs can make contact with the other valve disc after travelling a determinable distance during the opening procedure and wherein the two valve discs together form a hollow space from which a leakage liquid line leads to the outside.

With increasing automation in the beverage industry, the demand for automatic cleaning of the flow paths of the products was made. In this connection, program-controlled chemical cleaning procedures are known whose cleaning sequence can be started by remote control. For this purpose, valves are used which can be activated for the operational sequences which occur and are exactly determined. In the use of such valves, for example in rows of tanks, it must be possible to perform, in a simple manner, the individual operational sequences, such as filling, emptying, cleaning and disinfecting. In this regard, due to the stringent safety requirements, it is necessary to effectively separate the product from the cleaning liquid. In the use of single-acting valves, there is the disadvantage that the two media are mixed when leaks occur which, for example, may be caused by the adhesion of residual substances of the product. To avoid these disadvantages, valves with two valve discs are used, particularly in production plants of the beverage industry. The valve discs which can be moved relative to each other form a hollow space which is connected to a leakage liquid line which leads to the outside at its end which faces away from the valve seat. In this manner, due to the leakage liquid which is discharged to the outside, any leaks in the valve can be quickly detected and eliminated before further damage is done. However, this design has the disadvantage that a cleaning of such a complicated valve causes significant difficulties.

The invention is based on the task to make possible a relatively simple and safe cleaning of such valves and to ensure the microbiological purity of all liquid-conducting parts and, thus, also of those seat surfaces of both valve discs which face away from the hollow space, wherein it should be possible to clean the hollow space and the seat surfaces jointly as well as individually, depending on the conditions of the respective program sequence.

According to the invention, this task is solved in a double seat valve of the above-mentioned type by the following features:

(a) the first valve disc is connected to an adjusting device which moves the first valve disc into an opening position toward the second valve disc, (b) the first valve disc additionally has a second adjusting device which moves the first valve disc into an opening position, but prevents any contact with the second valve disc, and (c) the second valve disc has an independent adjusting device which counteracts the spring action and moves the second valve disc into an opening position in such a manner that the outlet cross-section is smaller than the aperture cross-section of the leakage liquid line leading to the outside.

It has been found advantageous that a piston which can be loaded with a pressure medium is arranged as the adjusting device, the effective contact surface of this piston being constructed larger than the piston of main adjusting device.

To ensure a supply of the cleaning liquid as exact as possible, within the scope of the invention it is further suggested that the line for the cleaning medium is constructed as a nozzle and is arranged in the discharge line.

DETAILED DESCRIPTION OF THE INVENTION

Figure 1:
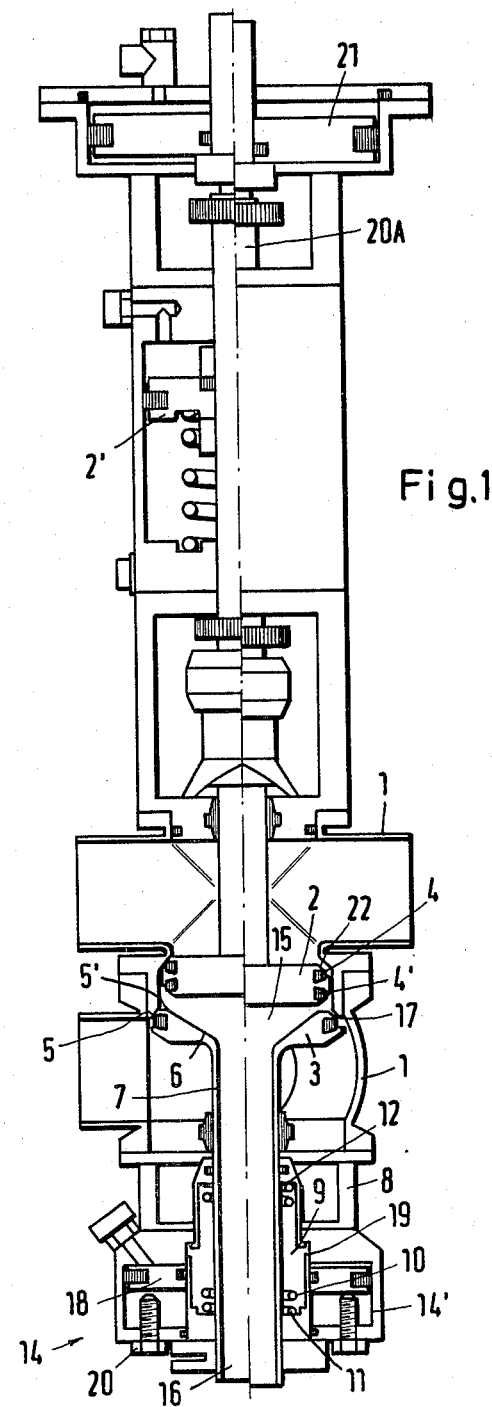
FIG. 1 is an axial sectional view of a double seat valve embodying the present invention.

In the drawing, two embodiments of the invention are shown in a simplified manner. According to the illustrated embodiment FIG. 1, the distributing device comprises a housing 1 which may be constructed as a multipath distributor, and connections for a line system which are not shown in detail. Within the housing 1, there are guided two valve bodies 2, 3 which can be moved independently of one another. The upper valve body 2, as seen in the plane of FIG. 1, is connected to an adjusting device 2′. The actuation of this adjusting device is carried out by remote control in dependence on a predeterminable program.

On two oppositely located sides, the upper valve body 2 has a seat surface 4, 4′ each. The second valve body 3 which is supported independently of valve body 2 also has two seat surfaces 5, 5′. A conically narrowing portion 6 leads from these seat surfaces 5, 5′ to a tubular valve shaft 7. Underneath the housing 1, there is arranged a spacer 8 and, within this spacer 8, a spring housing 9. A compression spring 10 located within the spring housing 9 bears against the end face 11 of the spring housing 9. The opposite end face of the spring rests on a surface 12 and biases the second valve body into the closed position.

The two valve bodies 2, 3 form a hollow space 15 which is connected to a leakage liquid line 16. The latter leads to the outside through the shaft 7 of the lower valve body 3. When the upper valve body 2 is actuated by operating the adjusting device 2′, a pressurized fluid is introduced through the connection 32 and acts on the piston-like adjusting device 2′. The adjusting device 2′ is fixed to the shaft 20A which, in turn, is fixed to the upper valve body 2. As a result the upper valve body 2 is moved in the axial direction toward the second valve body 3 and, against the action of the spring 10, moves also the second body 3 downwardly. In this manner, the product can flow through the distributing and switching device in the preselected direction.

Independently from the flow of the product, cleaning liquid is admitted to the distributing and switching device during the cleaning stage. According to the illustrated positions of both valve bodies 2, 3 as shown on the left hand side in FIG. 1, there is no danger that the liquid will flow into the corresponding line when any leaks occur in the upper or lower valve seat, since the leakage liquid first reaches the hollow space 15 and, from there, is guided through the leakage liquid line 16 to the outside. During the cleaning stage, cleaning liquid can be admitted to the product-conducting hollow spaces of the switching device. The hollow space 15 formed by the two valve bodies 2, 3 and the leakage liquid line 16 are not touched by the cleaning liquid. If also this region is to be subjected to a separate cleaning, the adjusting device 14 of the lower valve disc 3 is actuated by directing pressurized fluid through the connection 31. This adjusting device 14 consists of a housing 14' and a piston 18 which is guided on a bushing 19 which surrounds the shaft 7. Screws 20 are provided for the adjustment of the stroke of the adjusting device, that is, for limiting the axial displacement of the piston 18 and thereby limiting the amount that the lower valve disc is moved into the open position. When the adjusting device 14 is operated, the valve disc 3 is lifted off its seat. The displacement of the valve disc 3 occurs when the piston 8 is moved downwardly and contacts the upper end of an annular sleeve 30 encircling the bushing 19 and formed integrally with the spacer member 29 which is attached by screws 29A to the bottom of shaft 7. The downward displacement of the shaft 7 is effected against the upward biasing action of the spring 10. In this manner, cleaning liquid reaches the hollow space 15 through the annular gap 17 and the outside from this hollow gap 15 through the leakage liquid line 16. The desired amount of cleaning liquid is determined by the adjustable stroke of the adjusting device 14 established by changing the positions of the screws 20. The two valve bodies and/or their valve seats thereby form a gap cross-section which, as a maximum, corresponds to the outlet cross-section of the leakage liquid line 16. The amount flowing through can be adjusted in any chosen manner on the basis of the adjustability of the assigned parts. In order to be able to also clean the upper seat 4 or its countersurface, on the shaft 20A of the upper valve disc 2 there is also provided an adjusting device or piston 21 located within a cylinder 25. The piston 21 is slidably supported on the extension 20B of the shaft 20A. The extension 20B is secured to the shaft 20A by a coupling 28. The lower face of piston 21 rests on a ring 27. When pressurized fluid is introduced into the cylinder 25, piston 21 slides downwardly on the extension 20B and displaces the ring 27 and the shaft 20A a short distance by means of which disc 2 can be moved, independently from the position of the second disc 3, into an opening or cleaning position. As a result, during the cleaning procedure, cleaning liquid reaches the hollow space 15 through the gap 22 and, from there, the outside through the leakage liquid line 16. In this manner, the individual valve discs 2, 3 can be opened and closed jointly as well as individually and, moreover, by actuating the main adjusting device 2' the valve discs can jointly be moved into an opening position. When the adjusting device or piston 2' is moved downwardly by pressurized fluid admitted through the connection 32, the shaft 20A and extension 20B moves downwardly with the extension 20B moving relative to the piston 21. The downward movement of the piston 2' is against the biasing action of the spring 33 which returns the valve disc 2 to the closed position when the pressurized fluid ceases to act on the piston 2'. In FIG. 3 the structure of the double seat valve is shown in more detail than in FIGS. 1 and 2. In FIG. 3 the spacing of the piston 21 above the bottom of cylinder 25 indicates the axial distance the upper valve body 2 can be moved when the pressurized fluid is introduced into the cylinder and moves the piston against the bottom of the cylinder. In FIG. 3 the upper valve disc 2 and lower valve disc 3 are in the closed position. Thus, depending on the above-described cleaning program, a cleaning of all liquid-conducting parts of such a double seat valve is ensured.

Figure 2:
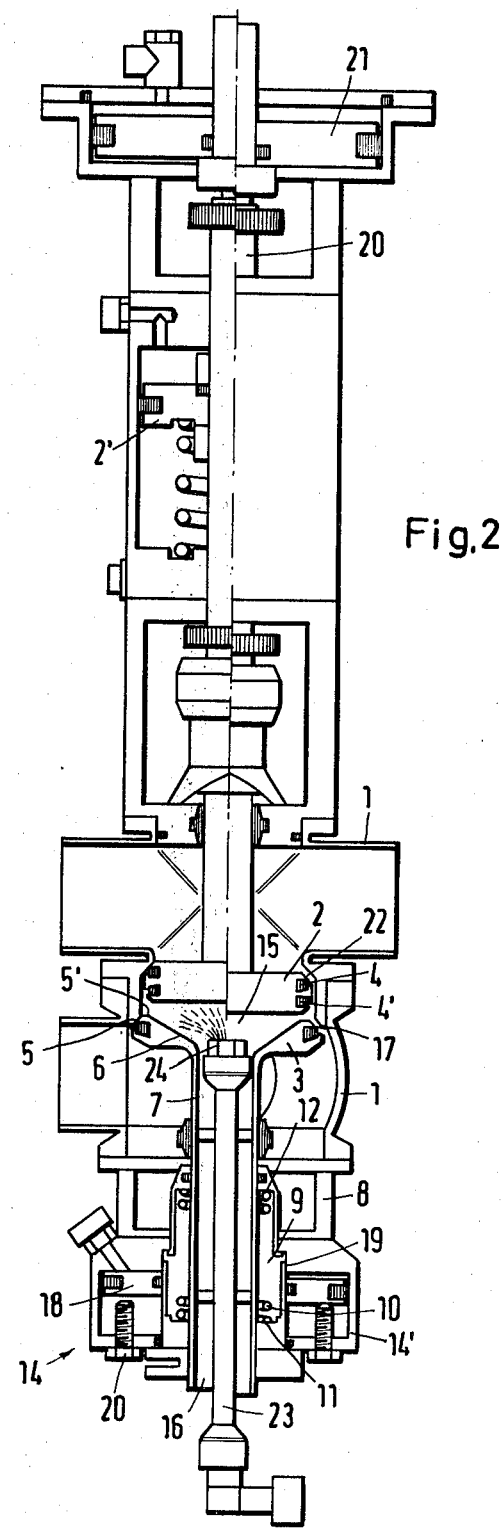
FIG. 2 is a sectional view similar to FIG. 1 of another embodiment of the double seat valve of the present invention.
Figure 3:
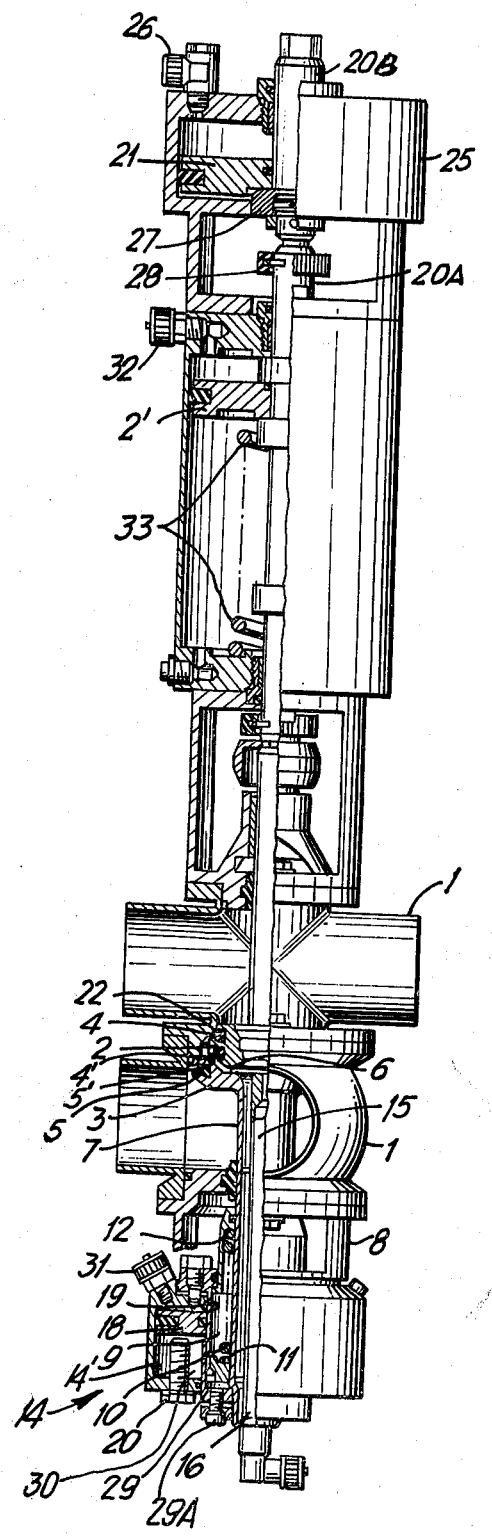
FIG. 3 is an elevational view partly in section of the double seat valve illustrated in FIGS. 1 and 2.

In FIG. 2 another embodiment of the double seat valve is illustrated in which the parts similar to the embodiment in FIG. 1 bear the same reference numerals. Basically, both embodiments are similar with the only difference residing in the provision of a line 23 for the cleaning medium extending through the lower valve shaft 7. The line 23 extends through the leakage liquid line 16 and its outlet end, directed into the hollow space 15, is equipped with a nozzle 24.

While specific embodiments of the invention have been shown and described in detail to illustrate the application of the inventive principles, it will be understood that the invention may be embodied otherwise without departing from such principles.

We claim:

1. Double seat valve with leak control comprising a housing, a first valve disc located within said housing, an axially extending first shaft connected to said first valve disc, first means connected to said first shaft for movably displacing said first valve disc in the axial direction of said first shaft between a closed position with said first valve disc in sealed contact with said housing and an open position with said first valve disc spaced out of surface contact with said housing, a second valve disc located in said housing opposite said first valve disc, an axially extending second shaft connected to said second valve disc with the axes of said first and second shafts disposed in parallel relation, second means connected to said second shaft for movably displacing said second valve disc in the axial direction of said second shaft between a closed position with said second valve disc in sealed contact with said housing and an open position with said second valve disc spaced out of contact with said housing, said first valve disc being displaceable by said first means into the open position wherein said first valve disc is movable into contact with said second valve disc and said first and second valve discs being shaped to define therebetween a hollow space, a leakage liquid line being open at one end to said hollow space and at the opposite end to the exterior of said housing, wherein the improvement comprises that said first and second shafts being in general axial alignment and being spaced apart in the axial direction, said first and second valve discs being in spaced relation when each is in the closed position with said first valve disc being movable from the closed position toward said second valve disc into the open position and said second valve disc being movable away from said first valve disc in the closed position when said second valve disc is moved from the closed position into the open position, a spring biasing said second valve disc into the closed position, said first means includes a first adjusting device for moving said first valve disc into the open position and into contact with said second valve disc and for moving said second valve disc into the open position against the biasing action of said spring, said first means also includes a second adjusting device operable separately from said first adjusting device for moving said first valve disc independently of said second valve disc into the open position with said first valve disc spaced out of contact from said second valve disc and forming in combination with said housing an annular gap open to the space between said first valve disc in the open position and said second valve disc in the closed position, and said second means includes a third adjusting device operable separately from said first and second adjusting devices for moving said second valve disc independently of said first valve disc against the biasing action of said spring into the open position forming an annular outlet opening between said second valve disc and said housing opening to said hollow space with said first valve disc in spaced relationship to said second valve disc so that the area of the outlet opening is not greater than the transverse cross-sectional area of said leakage liquid line open to said hollow space.

2. Double seat valve, as set forth in claim 1, wherein said first shaft extends outwardly from said first valve disc in the opposite direction from which said second shaft extends outwardly from said second disc, said second adjusting device is located at the end of said first shaft spaced outwardly from said first valve disc and outwardly from said first adjusting device, and said third adjusting device is located at the end of said second shaft spaced outwardly from said second valve disc and said second and third adjusting devices being adjustable for varying the axial displacement of said first and second disc valves.

3. Double seat valve, as set forth in claim 1, wherein a cleaning medium supply line extends into said housing and has an outlet end directed into the hollow space formed by said first and second valve discs.

4. Double seat valve, as set forth in claim 3, wherein the outlet end of said cleaning medium supply line comprises a nozzle.

5. Double seat valve, as set forth in claim 3, wherein said second shaft is a tubular shaped member and the hollow interior thereof forms said leakage liquid line, and said cleaning medium supply line extends through the hollow interior of said second shaft.

6. Double seat valve, as set forth in claim 1, wherein said first valve disc has a first valve seat for contacting said housing in the closed position and a second valve seat for contacting said second valve disc in the open position of said first valve disc, said second valve disc has a first valve seat for contacting said housing in the closed position and a second valve seat for contacting said second valve seat of said first valve disc when said second valve disc is moved into the open position by said first adjusting device.

* * * * *